United States Patent [19]

Bigari

[11] Patent Number: 5,010,485

[45] Date of Patent: Apr. 23, 1991

[54] APPARATUS, SYSTEM AND METHOD FOR CREATING CREDIT VOUCHERS USABLE AT POINT OF PURCHASE STATIONS

[75] Inventor: Steven T. Bigari, Colorado Springs, Colo.

[73] Assignee: JBH Ventures, Manitou Springs, Colo.

[21] Appl. No.: 304,566

[22] Filed: Jan. 31, 1989

[51] Int. Cl.$^5$ .............................................. G06F 15/30
[52] U.S. Cl. .................................... 364/408; 235/379; 902/22
[58] Field of Search ...................... 364/479, 401, 408; 235/380, 381, 382, 379; 340/825.26, 825.27, 825.33, 825.35; 902/22

[56] References Cited

U.S. PATENT DOCUMENTS

| | | | |
|---|---|---|---|
| 4,321,672 | 3/1982 | Braun et al. | 364/408 |
| 4,341,951 | 7/1982 | Benton | 235/379 |
| 4,672,377 | 6/1987 | Murphy et al. | 340/825.33 X |
| 4,683,536 | 7/1987 | Yamamoto | 364/408 |
| 4,837,422 | 6/1989 | Dethloff et al. | 235/380 |
| 4,870,596 | 9/1989 | Smith | 364/479 |

OTHER PUBLICATIONS

Weinstein, M. "Card Firms to Offer Travel Vouchers: Visa, Mastercard Programs Permit Consumers to Pay in Advance for Services", *American Banker*, Jun. 19, 1985, 6.
Weinstein, M. "Visa Plans Standard Travel Voucher", *American Banker*, Oct. 29, 1984, 27.
"CVI Launches Card-Operated Vender for Rental/Sale of Video Cassettes", *Vending Times*, Aug. 1985, 15.
"Car-Rental Companies: The Best and the Worst", *Consumer Reports*, vol. 54, No. 7, Jul. 1989, 477–480.

*Primary Examiner*—Clark A. Jablon
*Attorney, Agent, or Firm*—Timothy J. Martin

[57] ABSTRACT

Apparatus, system and method are provided for processing charge vouchers against charge card accounts administered by a host institution that issues an approval/disapproval to a merchant for a proposed transaction. The apparatus is processor based and broadly includes a keyboard input having command keys and a charge card reader. Upon activation, account identification data is read from a customer's charge card and the customer enters a maximum charge amount. An autodialer connects the processor to the host institution by way of a transmitter/receiver and a communication line. The host verifies the credit limit of the customer account to ascertain availability of funds. If the host approves the proposed transaction, the maximum charge amount is reversed and an approval signal is sent to the processor; if the host does not approve the transaction, a disapproval signal is sent. The processor stores the transaction data and causes a printer to produce a voucher good for the maximum charge amount upon receipt of the approval signal. The customer then endorses the voucher and subsequently purchases goods/services for an actual purchase amount less than or equal to the maximum charge amount. The merchant updates the voucher at the time of purchase and either simultaneously or subsequently edits the memory of the processor to reflect the actual purchase amount. The actual transaction is then forwarded to the host institution which updates the customer account to release excess credit resulting from any difference between the maximum charge amount and the actual purchase amount. The broad method embodies the above procedure implemented in processing steps.

39 Claims, 7 Drawing Sheets

APPARATUS, SYSTEM AND METHOD FOR CREATING CREDIT VOUCHERS USABLE AT POINT OF PURCHASE STATIONS

FIELD OF THE INVENTION

The present invention relates generally to credit sales based on charge cards for purchasing consumer goods and services. More specifically, however, the present invention relates to an apparatus, system and method for allowing a credit purchase which may be implemented at purchase stations that require relatively rapid customer through-put, such as fast-food restaurants, theaters, grocery check-out lines and the like.

BACKGROUND OF THE INVENTION

Since the advent of charge cards, the incidents of credit purchases by consumers of goods and services has expanded at an astonishing rate. This expansion has resulted both from the increase in number of entities issuing charge cards and from the increase in the number of merchants accepting charge card purchases for goods and services. As used herein, the term "charge card" broadly means any type of merchant financial or bank card used to purchase goods and/or services against credit and charge accounts of a customer against debit accounts of a customer to existing accounts against other accounts and fund transfer systems.

The present invention on one hand may thus be used with, for example, "universal charge cards" that are accepted by a variety of merchants of different goods or services. Examples of these universal charge card systems are Master Card, Visa, American Express, Diner's Club, to name a few. In these systems, the holder of a member card typically has an established credit limit so that purchases may be made utilizing the card up to the established limit. Charges against the card holders credit account are accumulated on a periodic basis and the card holder is billed either for a portion of the credit purchases or for the entire amount. Should the credit limit be reached by the card holder at any time during the billing cycle, additional charges are not permitted on the respective charge card. Further, the institutions administering the charge cards may charge the card holder an annual administration fee as well as interest on the credit purchases. Also, the administering institutions often charge merchant members who accept credit purchases against the card holder's credit accounts, a transaction fee equal to a percentage of the charged amount. On the other hand, "special charge cards" may be those which large businesses or merchants, such as department stores, retail chains and the like, produce for use by customers at particular stores or for use with affiliated entities. These charge cards usually have only limited acceptance at the issuing institution and typically may not be used for purchases at non-affiliated businesses. In addition to the above-referenced charge cards, there are additional cards known as "debit cards." The holder of a debit card may purchase goods and services with such cards. However, rather than the purchase being considered a purchase on credit, for which the card holder may pay an interest charge, the debit card creates a direct debit into an account, such as a checking or savings account, maintained by the card holder. While technically debit cards operate differently from credit or charge cards, for purposes of the description herein, it should be appreciated that debit cards may be broadly included within the class of credit or charge cards. It should be understood that the present invention applies not only to universal charge cards, but also to special charge cards, debit cards and any other credit or deposit system used to pay for goods and services.

Even though the industry of financial transactions has experienced rapid growth in the use of charge cards, it has been recognized that, at least for the United States, the biggest growth in the volume of transactions will not come from signing new card holders, but rather will come from signing new outlets as merchant members to existing charge card systems. Of particular interest as a target market for new merchant members are fast-food retailers, movie theaters and other businesses which have heretofore avoided implementing systems of credit purchases due to the time and labor intensive process of conducting the charge card transaction event.

More particularly, in business such as fast food restaurants, theaters and the like, the linchpin of success is the ability of rapid throughput of customer transactions. Thus, for example, where a customer places his/her food selections in fast-food restaurants, many fast-food outlets desire that the transaction event be completed in less than one minute. Prior to the invention of the present system, these fast-food outlets have found that the interval of time necessary to execute a transaction event with a charge far exceeds the throughput interval. The reason for delay is that a charge transaction has required the creation of a physical charge voucher for the amount of purchase, the signing of the charge voucher by the card holder and the entry of the transaction all at the point of purchase station.

In recent times, the typical length of a credit transaction has even increased due to a desire both by the administering institutions and by the merchant members to validate the charge transaction prior to accepting the same. To this end, various charge approval institutions, which may be referred to as "host institutions" have been created as clearing houses for charge card credit transactions. Here, a host institution administers a family of charge cards; merchant members who accept those charge cards may affiliate with the host institution. When a charge transaction is proposed by a customer of the merchant member, the merchant member ordinarily creates the necessary transaction data to arrive at a transaction charge and then interrogates the host institution to obtain an approval or disapproval of the transaction amount. If the transaction amount if approved, the transaction is executed; if the transaction is disapproved, it is not executed. This procedure takes place at the point of purchase station, such as the cash register.

The host institution maintains credit limit files for the member card holders, and the respective host institution will review a card holder's available credit before issuing an approval for the transaction. If the transaction is approved, the host institution deducts the transaction amount from the card holder's account file to reduce the available credit limit. One of the services provided by the host institution is that, where a hard copy credit voucher is issued and that transaction is approved, the host institution guarantees payment to the merchant member of the approved amount. The host institution may also periodically transfer funds to the merchant member equal to the accumulated approved transactions processed by the respective merchant member.

While many attempts have been made at creating credit card systems that may be readily implemented by fast-food outlets and other high throughput merchants, until the present invention, there has not been a system found suitable for use by such merchants. Thus, there is present a tremendous need and a tremendous potential market for an apparatus, system and method which will allow these outlets to accept credit purchases without destroying high throughput rate.

SUMMARY OF THE PRESENT INVENTION

It is an object of the present invention to provide a new and useful system, apparatus and method for implementing credit purchases at locations which require rapid throughput of transaction events.

It is a further object of the present invention to provide an apparatus system and method wherein most time and labor intensive activities corresponding to a charge transaction are performed by the holder of a charge card at a location remote from the point of purchase station wherein the transaction event is completed.

It is yet another object of the present invention to produce credit vouchers remote from the point of purchase station which charge voucher will be accepted by and guaranteed for payment from a host institution.

A still further object of the present invention is to provide an apparatus, system and method for creating charge transactions that may be updated so that the effect on the available credit limit account maintained by the host institution for the respective card member is minimally affected.

According to the present invention, then, a system for implementing credit purchases is provided between a customer, a host institution and a merchant member affiliated with the host institution. Integral to this system is a payment voucher apparatus located remotely from the point of purchase station (typically a cash register). This payment voucher apparatus is adapted for use in conjunction with a family of charge cards wherein customers who have a respective member of said family of charge cards can execute transactions in order to obtain a guaranteed voucher for a selected ceiling amount for use in purchasing goods or services from the merchant. This system also relies upon the existence of a host institution with which the merchant member is affiliated and wherein the host institution administers accounts for the family of charge cards and issues an approval/disapproval status for a proposed credit charge and further guarantees payment of the proposed charge when a merchant member receives an approval thereof.

The payment voucher apparatus broadly includes a transmitter and receiver which may be connected to a communication line for transmitting and receiving data to and from the host institution and the merchant member. A programmed data processor is in communication with the data transmitter and receiver, and a data entry means, such as a keyboard, is provided for inputting into the microprocessor transaction data corresponding to the proposed charge. Typically, the data entry means also includes command keys for the processor. A start signal is produced to initiate a transaction event. This may occur by activating a command key, such as a "start key," or by some other event such as insertion of a charge card. Means is provided which is responsive to the activation of the start key in order to open the communication line with the host institution; this may be an autodialer. A charge card reader receives a customer charge card and reads information contained thereon to produce identification data corresponding to the charge card, with this identification data then being transmitted to the host institution by the data transmitter/receiver over the communication line opened by the autodialer. The data processor is operative in response to transaction data entered by the manual entry means to interrogate the host institution by way of the data transmitter/receiver in order to obtain the approval/disapproval status signal for the proposed charge. Further, the data processor is operative in response to an approval signal to produce a print signal. Means, such as a printer, is provided to produce a voucher for a maximum approved charge corresponding the the proposed charge in response to a print signal; this voucher is indexed with both transaction identification data and maximum approved charge data entered thereon by the printer.

The customer endorses the voucher, still at the location remote from the point of purchase station. The voucher thus becomes valid for the maximum amount of the proposed charge. The card holder only then approaches the point of purchase station and places his/her order for goods or services and the actual transaction is totaled. The attendant of the point of purchase station updates the voucher for an actual charge amount less than or equal to the maximum purchase amount approved by the host institution.

After a plurality of transactions occur over a selected billing cycle, the merchant edits them by accessing the payment voucher processing apparatus to edit the proposed transaction data contained therein to reflect the actual charge associated with each respective transaction indexed by the identification data. The total charge purchases are also accumulated for all of the plurality of actual charges. The autodialer again establishes communication with the host institution and the stream of actual transactions are transmitted to the host institution as well as the accumulated charge total.

During the time from the approval of a transaction until receipt of the edited transaction data, the host institution interacts with the card holder file in its records to deduct the proposed transaction amount from the available credit and reserve the maximum charge amount, but, upon receipt of the actual transaction data, the host institution includes means for updating the card holder file to recredit that file with the difference between the proposed transaction and the actual transaction amount previously held in reserve by approval of the proposed transaction. This excess again becomes available for use by the cardholder. The host institution also generates a funds credit representative of monies transferred to the merchant member for the accumulated total of all transactions. In its broad form, the method implemented by the present invention includes a plurality of processing steps. First, at least one payment voucher producing apparatus and at least one point of purchase sale station is provided at different locations within the facility of a merchant. Next, identification data is entered into the payment voucher producing apparatus according to a respective charge card, and a maximum charge amount is entered into the payment voucher producing apparatus corresponding to a proposed charge transaction. The identification data and the maximum charge amount correlated thereto are electronically transmitted to the host institution over a communication line. The host institution verifies the available credit limit in the member card account corresponding to the respective customer charge card and a determination is made as to whether the credit limit of the member card account is being exceeded. The host institution then issues either an approval signal or a disapproval signal. The next step in the process is automatically producing a voucher at the payment voucher producing apparatus in response to receipt of the approval signal and storing the proposed charge transaction in memory of the data processor. The purchase transaction is then completed for selected goods or services at the point of purchase station and the method includes the updating of the voucher at the point of purchase station to reflect the actual purchase amount. The proposed charge transaction is then edited utilizing the data processor at the payment voucher apparatus to edit the maximum charge amount to an updated charge amount equal to the actual charge amount, and the updated charge amount and the corresponding identification of the respective customer charge account is electronically transmitted to the host institution. The host institution then retrieves and updates the respective member card account and edits the maximum charge account to release the difference between the updated charge amount and the maximum charge amount back into the member charge account to be available for a customer's future charge.

While the above description sets forth a broad description of the apparatus, system and method according to the present invention, additional features are present, such as reset functions, transaction accounts cancel functions, automatic updating means and display of transaction information and instruction, as well as time out circuitry. The structure and features are described thoroughly in the detailed description below.

The above objects and other objects of the present invention will become more readily appreciated and understood from a consideration of the following detailed description of the preferred embodiment when taken together with the accompanying drawings, in which:

DETAILED DESCRIPTION OF THE PREFERRED EMBODIMENT

The present invention relates to a payment voucher processing apparatus and system adapted to be used in conjunction with a family of charge cards in order to execute proposed transactions and obtain a guaranteed voucher for a selected maximum charge amount for the purchase of goods and services from a merchant. In addition, the present invention relates to a method implemented by this payment voucher process apparatus and system. Broadly, the credit system includes both a payment voucher processing apparatus and a point of purchase transaction station remotely located from one another at a merchant's facility, and a host institution verification center to which the merchant subscribes and which institution administers customer accounts for the family of charge cards and issues an approval or disapproval for a proposed charge against a particular customers account according to the availability of funds in those accounts as established by the customers credit limit.

Figure 1:
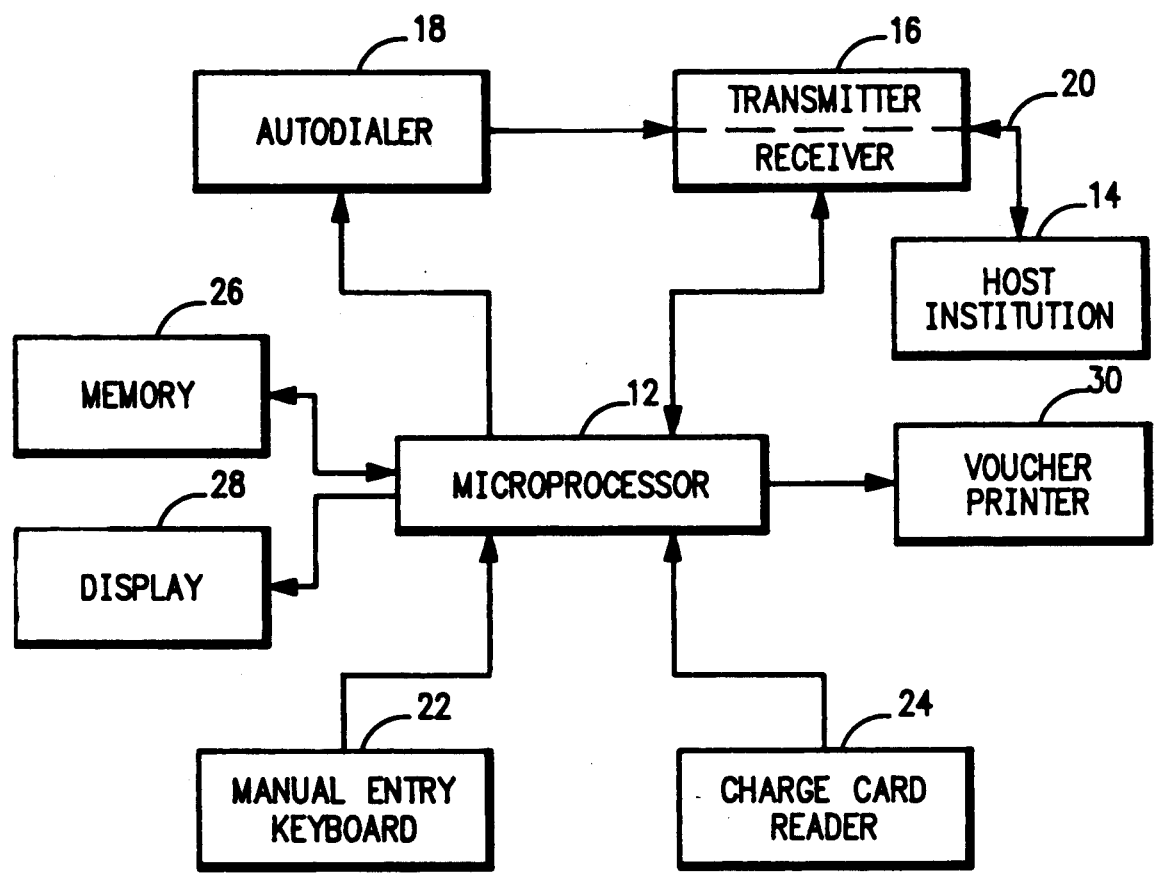
FIG. 1 is a diagrammatic view of the payment voucher apparatus according to the preferred embodiment of the present invention.

As shown in FIG. 1, the payment voucher processing apparatus 10 includes processing means, preferably in the form of an data processor such as microprocessor 12. Microprocessor 12 may be placed in communication with a host institution 14 by means of a transmitting means and a receiving means such as a telephone transmitter/receiver 16. Microprocessor 12 instructs an autodialer 18 to activate telephone 16 so as to open communication line 20 to host institution 14.

Input into microprocessor 12 is provided by data entry means, preferably in the form of manual entry keyboard 22 and charge card reader 24. Keyboard 22 may include command key means for microprocessor 12; these may include a "start" key which is operative to produce a start signal to initiate a transaction event. Microprocessor 12 responds to such start signal to command autodialer 18 to immediately open communication line 20 to host institution 14. Charge card reader 24 may be of a variety of charge card reader commercially available to interface with traditional charge cards so as to read account identification data therefrom. Charge card reader 24 presents the account identification data corresponding to a charge card administered by the host institution in a machine in a readable format to the microprocessor 12 and, to this end, includes traditional numeric keys. Again, other types of keyboards may be employed, for example, a keyboard indexed with products to be selected. The start signal, if desired, can be automatically produced in response to insertion of a charge card into card reader 24 or by other structure known in the art other than a designated command key.

Keyboard 22 is used to input a proposed transaction amount in the form of a selected maximum charge amount into microprocessor 12. Microprocessor 12 has data storage means in the form of memory 26, and means for retrieving stored data and a time-out clock. Further, a display 28 is provided to display information and otherwise communicate with the operator of microprocessor 12, as described more thoroughly below.

Microprocessor 12 also drives a voucher printer 30 which produces a voucher in any suitable format developed in the art. In the preferred embodiment of the present invention voucher printer 30 produces a voucher in the form of printed duplicate credit receipts A, B, but it should be understood that a voucher according to the scope of the present invention could include any item capable of indexing account identification data for the charge card and a maximum charge amount that may be used for purchase of goods or services from the merchant. These could be magnetic strips, cards and numerous other record systems adaptable to vouchers.

Figure 2:
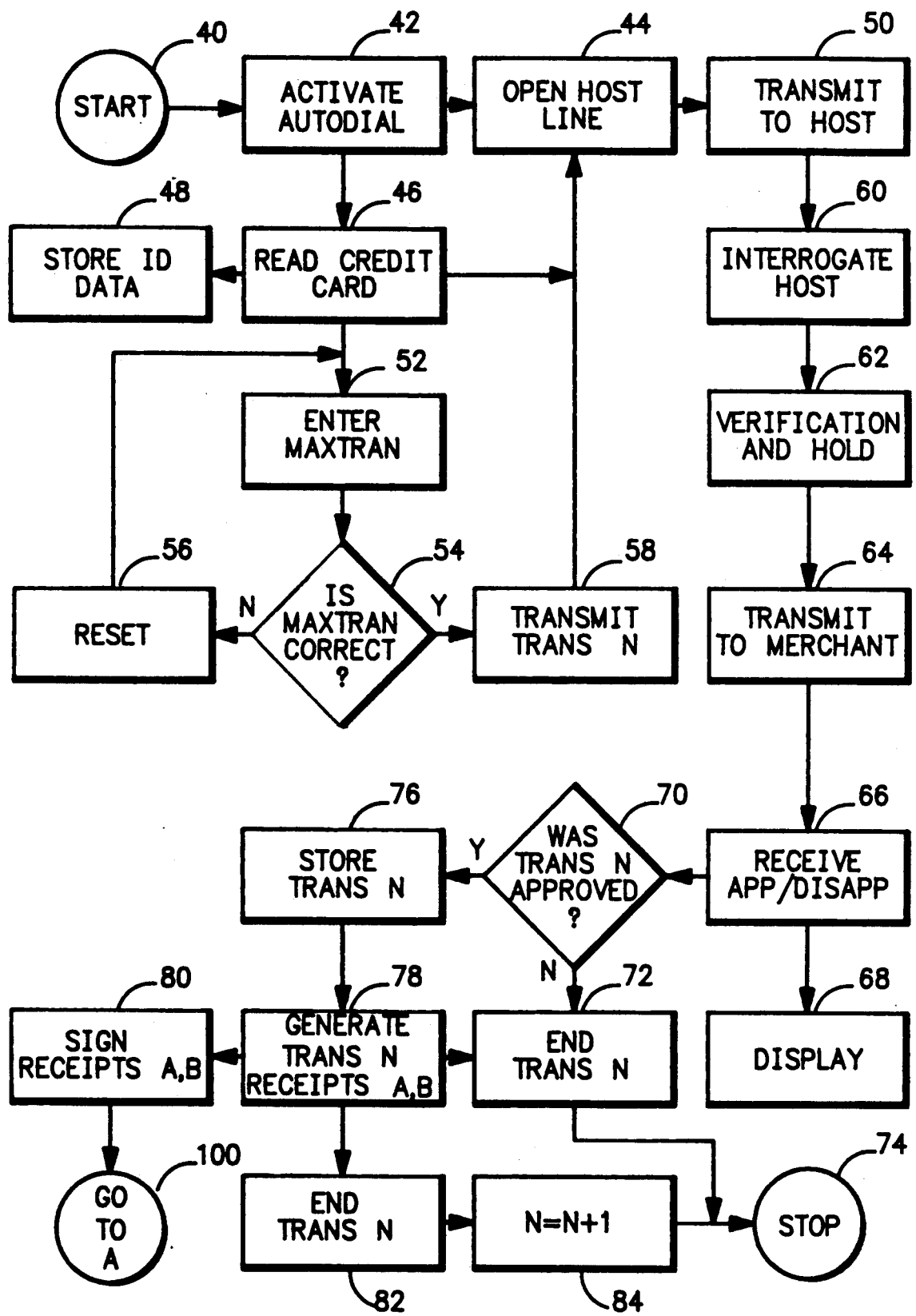
FIG. 2 is a schematic flow chart depicting the processing methodology and structure implemented by the payment voucher apparatus shown in FIG. 1 in conjunction with a host institution according to the principles of the present invention.

FIG. 2 shows a schematic flow chart of the initial phase of operation of the preferred payment voucher processing apparatus 10. Activation of the "start" key, shown at 40 in FIG. 2, causes autodialer 18 to be automatically activated, at 42, and host line 20 is open as shown at 44. The user inserts a selected charge card into credit card reader 22 so that the account identification data of the charge card is read at 46 and stored by microprocessor 12 at 48. In addition to storing the account identification data at 48, microprocessor 12 causes the account identification data to be presented to the open host line and communicated to the host institution as is shown at 50. A customer then enters selected maximum charge amount by means of keyboard 22 as is shown as "maxtran" at 52. If desired, this maximum charge amount may be displayed by display 28, and the customer is integrated at 54 to determine if the maximum charge amount entered is correct. If the amount is not correct, keyboard 22 carries a command key, such as a "reset" key, to allow the proposed transaction to be reset, as at 56, and the customer can re-enter a new maximum charge amount. When the maximum charge amount is correct, the customer hits a transmit command key on keyboard 22 which causes the transaction to be transmitted, as at 58, to the open host line 20 so that the maximum charge amount data is electronically transmitted to the host, as at 50.

It should be understood that microprocessor 12 can be programmed to query the customer during the transaction and to display these queries on display 28; the customer then interacts with microprocessor 12 by way of the keyboard. To this end also, microprocessor 12 may include a clock means which may be programmed with preselected timed intervals. In the event a customer fails within the designated time interval to respond to microprocessor 12 with entry either of data or command information, the transaction is automatically terminated and reset. Further, the customer may reset or cancel the transaction at any time up until an actual credit voucher is issued.

Upon receipt of both the account identification data of a member charge card and the maximum charge amount by the host institution, the customer account correlated to the account identification data is integrated at the host institution, as is shown at 60. The host institution determines, at 62, whether the correlated customer account has available credit line funds at least equal to the maximum charge amount. If such funds are available, the host institution issues an approval status signal and reserves or "holds" funds from the customer account equal to the approved maximum charge amount. If the funds are not sufficient for the maximum charge amount, the host institution issues a disapproval status signal.

The approval or disapproval status is transmitted to the merchant, as at 64, so that telephone transmitter/receiver 16 receives the approval or disapproval as is shown at 66. The respective approval or disapproval signal may be displayed on display 28 and is shown at box 68 in FIG. 2. Similarly, the respective signal is presented to microprocessor 12. Microprocessor 12 determines, at 70, whether the transaction was approved. If the transaction received a disapproval signal, microprocessor 12 ends the transaction at 72 and returns the system to a stop condition as shown at 74.

If the maximum charge amount was approved, microprocessor 12 stores the maximum charge amount at 76 with this amount being correlated to the transaction identification data stored at 48, each of which is stored in memory 26. In addition, microprocessor 12 commands voucher printer 30 to generate the voucher according to the approved transaction with voucher printer 30 preferably producing duplicate printed credit receipts A, B, at 78. The customer may sign receipts A and B as shown at 80, when this occurs, the voucher becomes valid for a purchase amount up to the maximum charge amount which is shown thereon. To this end, it is preferred that both receipts A, B which comprise the voucher include both account identification data as well as the maximum charge amount permitted. Further, the voucher may be printed or indexed with an expiration date after which it ceases to be valid.

In addition to generating the receipts A, B, microprocessor 12 terminates the transaction, as shown at 82, and increments, at 84, for a new transaction and executes a stop, as shown at 74. The customer who has received receipts A, B then proceeds to a point of purchase station, as represented at 100.

Figure 3:
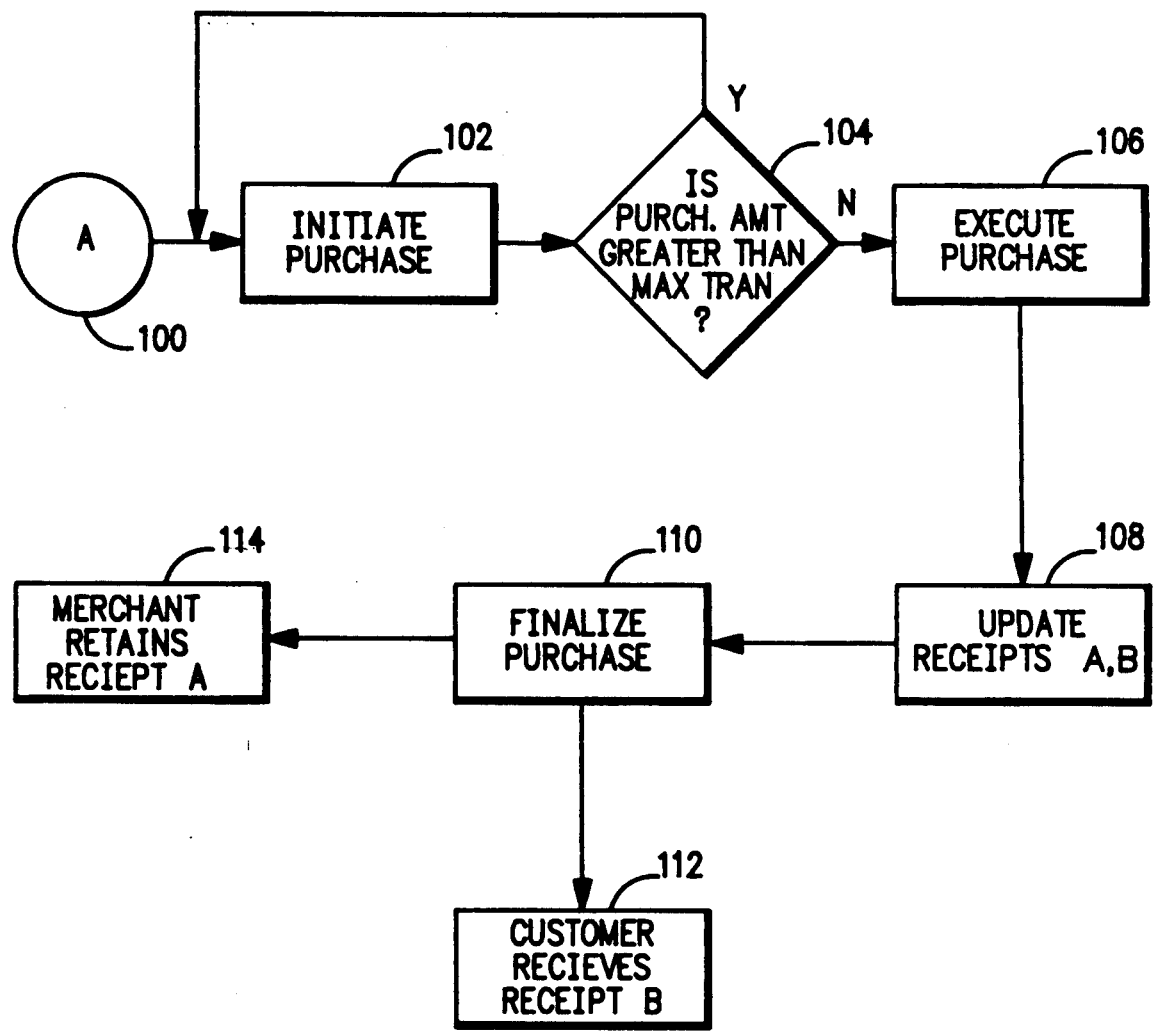
FIG. 3 is a schematic flow chart depicting the processing methodology and structure which occurs at the point of purchase station according to the principles of the present invention.

Referring to FIG. 3, a flow chart diagram is provided of the continuation of the purchased transaction of the customer at a point of purchase station which may be preferably be a cash register or the like. As is shown in FIG. 3, the point of purchase transaction occurs at 100 wherein a customer selects the goods and/or services to be purchased and initiates that purchase at 102. This amount is automatically calculated or is entered into the point of purchase accumulator, which may be conveniently referred to as a cash register. A decision is made either by the operator of the cash register or automatically, as described below, of whether the purchase amount is greater than the approved maximum charge amount. This determination is made at 104. If the purchase amount exceeds the maximum charge amount, a new purchase amount must be initiated at 102 until such time that the purchase amount is less than or equal to the maximum charge amount. When this occurs, the purchase is executed at 106 and the voucher is updated, as is shown at 108, to reflect the actual purchase amount, and the purchase is finalized at 110. The customer then receives the updated receipt B as shown at 112, while the merchant retains updated receipt A, as is shown at 114.

Figure 4:
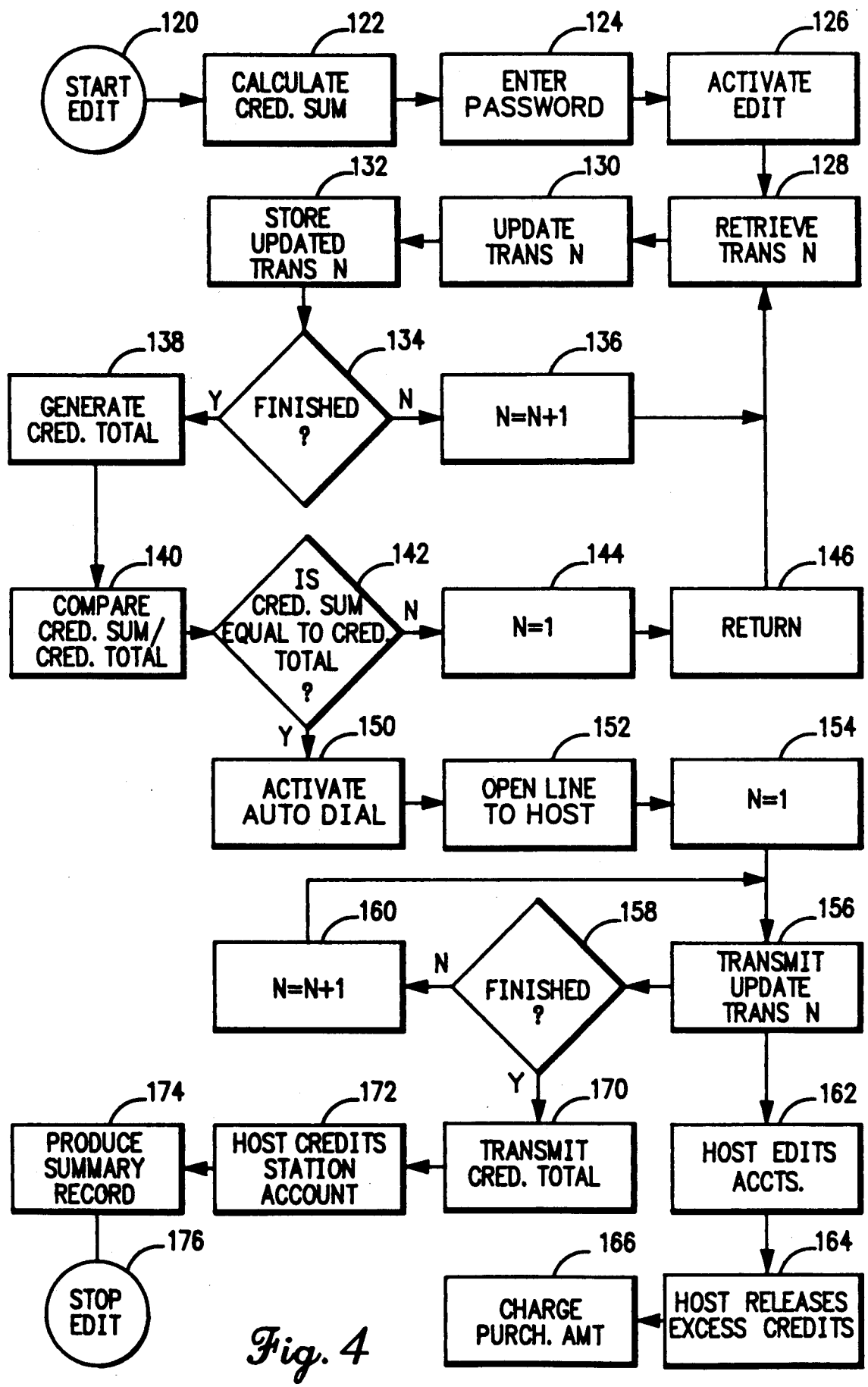
FIG. 4 is a schematic flow chart depicting the processing methodology and structure for editing the proposed transactions to justify the same with the actual transactions according to the principles of the present invention.

At periodic intervals, such as selected billing cycles, the merchant utilizes payment voucher processing apparatus 10 to edit a set of transactions, with this interval preferably being at least on a daily basis. The editing process is shown in FIG. 4 and initiates with a start edit as is shown at 120. A merchant initially calculates the sum total of actual purchase amounts of all updated vouchers, as represented by the updated amounts on the retained receipt A, as is shown at 122. The merchant then enters a password, at 124, to gain access to the editing function so that the edit function is activated at 126. A selected transaction is then retrieved at 128 and that transaction is updated at 130 to change the maximum charged amount (correlated to the respective account identification data) to the actual purchase amount made by that customer. The updated amount along with the identification data for the account is stored at 132 and a determination is made at 134 as to whether the updating process is completed. If it is not, the next transaction is incremented at 136 and again retrieved at 128. This loop continues until all actual purchase transactions are updated.

Microprocessor 12 has accumulator or summing capability so that it may generate a total credit amount, at 138, which is the aggregate sum of all updated actual purchase amounts for all actual transactions occuring during the relevant edited period. As is shown at 140, this credit total is compared with the credit sum calculated at 122 and a decision is made at 142 as to whether the credit sum calculated at 122 is equal to the credit total generated by the microprocessor at 138. If these amounts are not in balance, the edit function is reactivated by returning to the first transaction, as shown at 144, and the edit is returned at 146 to again retrieve the first transaction at 128. This loop continues until the credit sum balances the credit total.

As is shown at 150. when the credit sum is equal to the credit total, microprocessor 12 commands autodialer 18 so that autodialer 18 is activated to open a line to the host institution as is shown at 152. The first transaction are set at the first transaction, as shown at 154, and the updated first transaction information, containing the account identification data and the updated first actual purchased amount corresponding thereto, is transmitted at 156 to the host institution. A decision is made at 158 as to whether all updated transactions have been sent to the host institution. If not, the transaction is incremented, at 160, to the next transaction and the loop continues until all updated transactions are transmitted to the host institution. Thus, the transctions are sequentially transmitted to the host institution.

The host institution edits its customer accounts, at 162, so that each customer account is updated to release the differece between the actual purchase amount and the approved maximum credit amount for each respective account, at 164, and the host charges its customer members with the actual purchase amount for each transaction, as is shown at 166. Further, when transmission of all updated transactions is completed, microprocessor 12 transmits, at 170, the credit total generated at 138. When this occurs, the host institution credits the merchants account, at 172. Thereafter, in the normal course of its business, the host institution actually transfers these funds into the merchant's designated electronic funds account. If desired, a summary record of the transmitted transactions may be printed by printer 30, as at 174. The memory 26 may then be purged and the system stops edit, as is shown at 176. If a transaction is not completed during its valid period, it is purged from the microprocessor memory.

Figure 5:
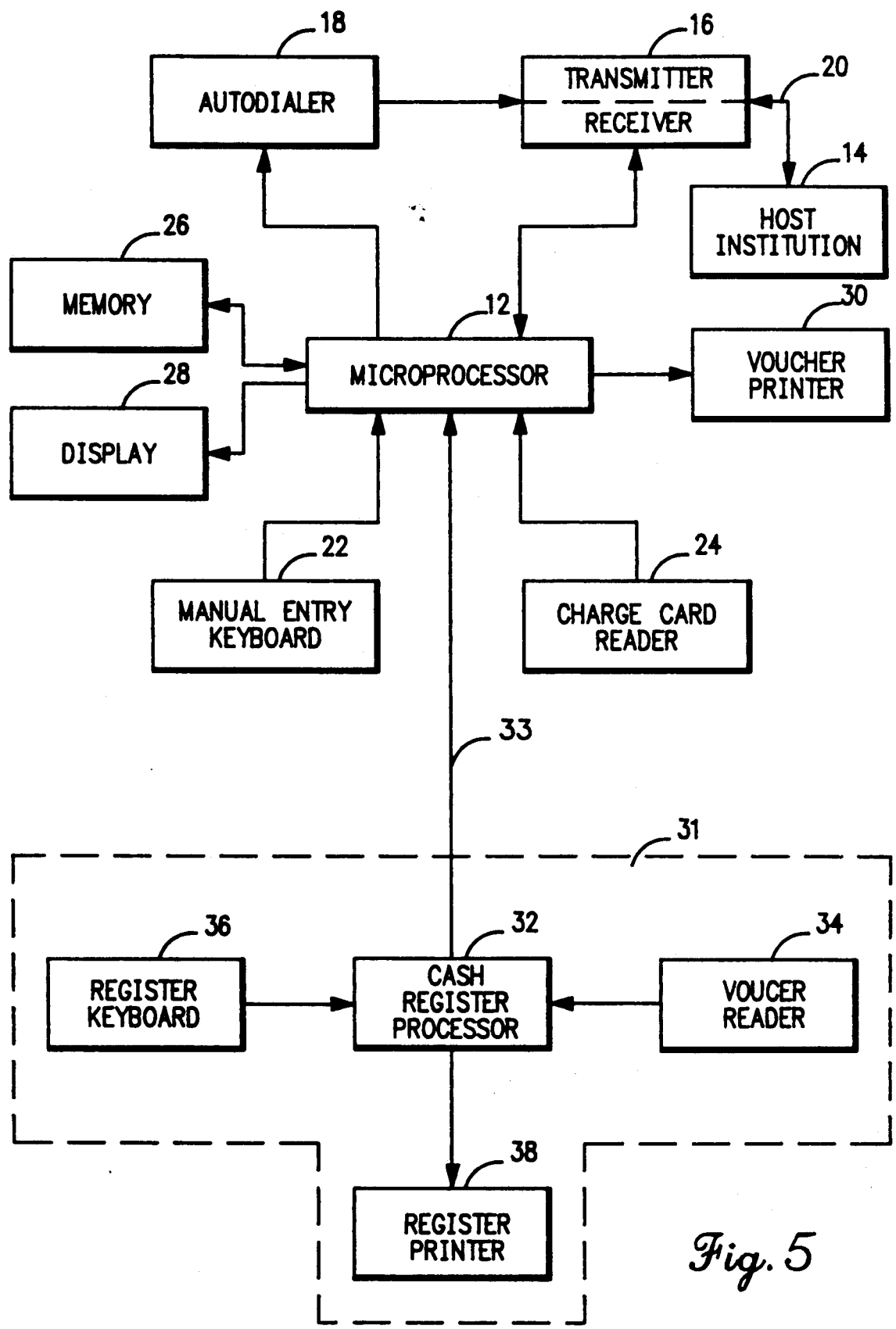
FIG. 5 is a diagrammatic view of a point of purchase station which has alternate methodology and structure in accordance with an alternate embodiment of the present invention.

FIGS. 5 through 8 show an enhanced payment voucher processing apparatus and system wherein the point of purchase register is integrated with payment voucher processing apparatus 10. As is shown in FIG. 5, a point of purchase station 31 may include a cash register processor 32 which is linked by communication line 33 to microprocessor 12. Cash register processor 32 is linked to a voucher reader 34 which can scan a voucher printed by voucher printer 30 to derive account identification data and maximum charge data from the voucher. Voucher reader 34 provides input to cash register processor 32 of this data. It should be appreciated that voucher reader 34 can be any suitable scan device, including optical scanning, magnetic scanning or others as are known in the art, to receive the voucher produced. In addition to the input received from voucher reader 34, cash register process is connected to and receives information from register keyboard 36 which allows the operator of the cash register processor to input data directly into register processor 32. Cash register processor 32 is also provided with comparator means and a register printer 38 which is operative to index or "reprint" a respective voucher with an actual purchase amount, as described below.

Figure 6:
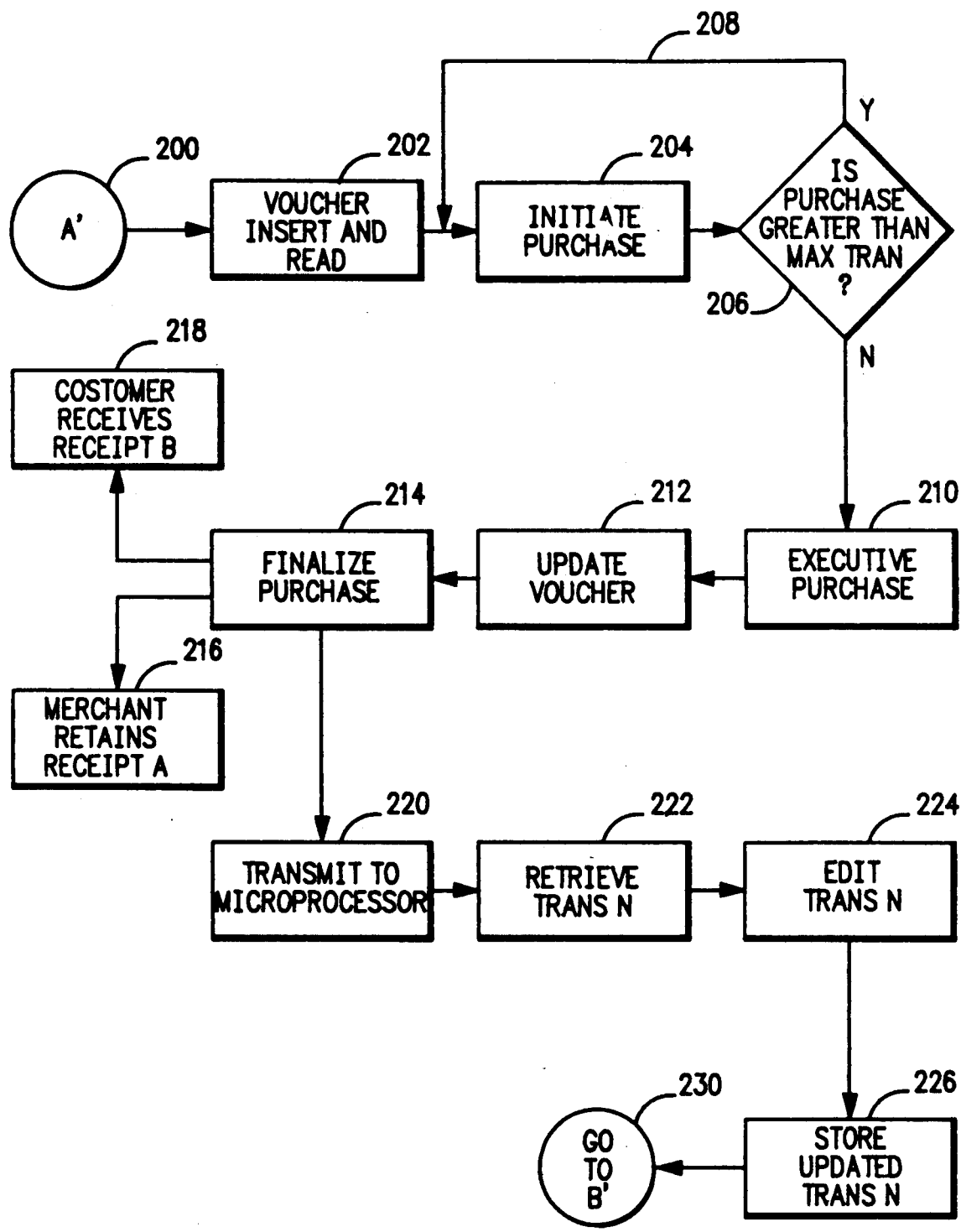
FIG. 6 is a flow chart depicting alternate processing methodology and structure in accordance wit use of the point of purchase station shown in FIG. 5.

As is shown in FIG. 6, which is similar to FIG. 3, a customer approaches the point of purchase sale as represented by station 31 shown in FIG. 5. In FIG. 6, this occurs at 200. When the customer reaches the point of purchase sale, the voucher is inserted in voucher reader 34 and is read, as is shown at 202. This reading of the voucher inputs the account identification data and the maximum charge amount into the cash register processor 32. The customer then initiates a purchase of goods or services at 204 which results in a purchase amount for the transaction. The actual purchase amount is automatically compared by a comparator means with the maximum charge amount as is shown at 206. In the event that the purchase amount is greater than the maximum charge amount, the customer must re-initiate a purchase for a lesser amount than is shown by loop 208. If the purchase amount is less than or equal to the maximum charge amount, the voucher is updated by register printer 38 to index the voucher with the actual purchase amount, as is shown at 212. The purchases in finalized at 214. The merchant retains receipt A at 216 and the customer is given receipt B as is shown at 218. In addition, when the purchase is finalized at 214, the updated transaction information is transmitted, at 220, to microprocessor 12. The microprocessor 12 then automatically retrieves the corresponding transaction, as shown at 222, and, as is shown at 224, microprocessor 12 updates the transaction and stores the updated transaction, at 226; thus, the stored transaction includes the account identification correlated to the actual purchase amount.

Figure 7:
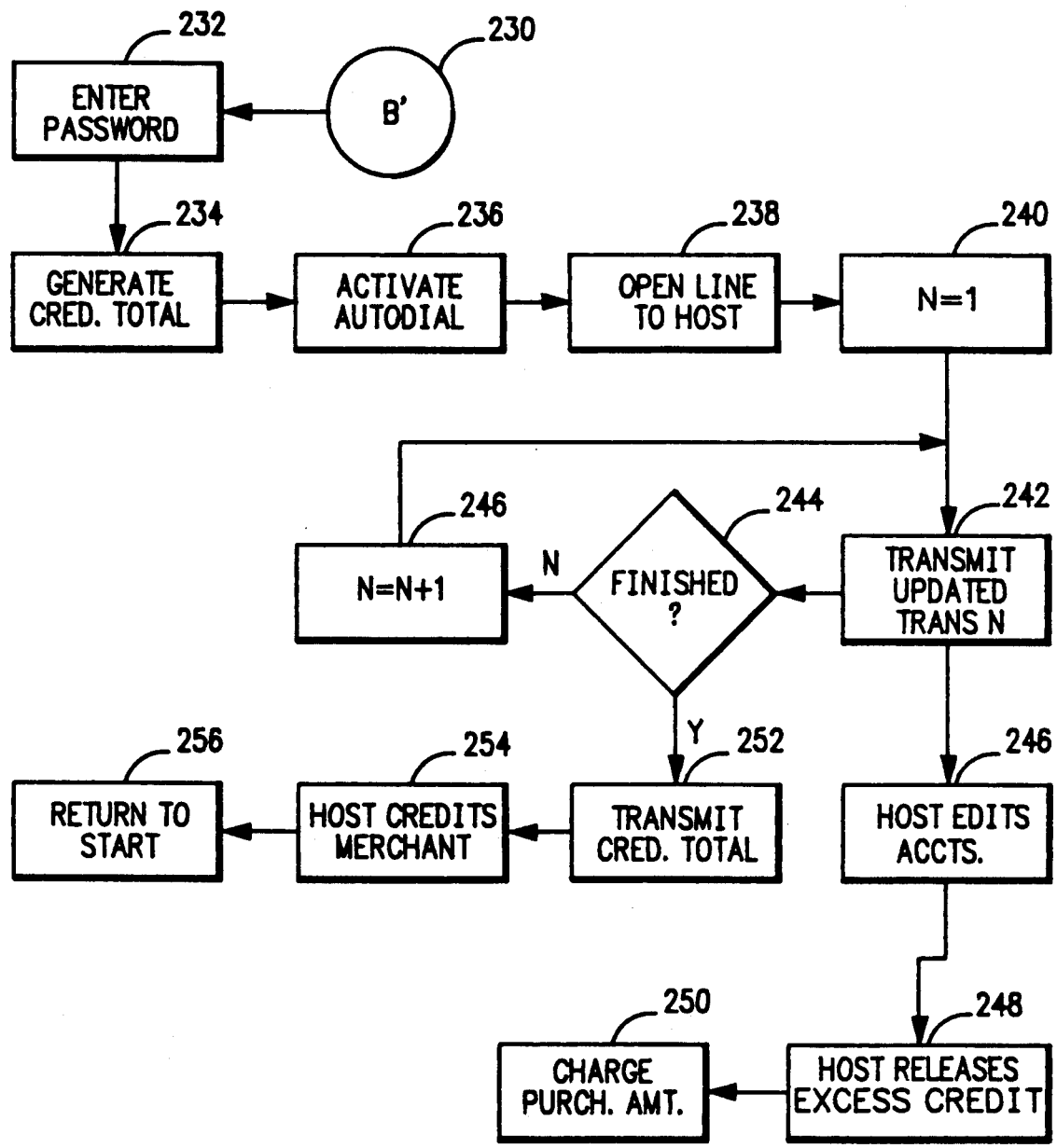
FIG. 7 is a schematic flow chart depicting the processing methodoloy and structure for editing transactions according to the alternate embodiment shown in FIGS. 5 and 6.

As is represented at 230 in FIGS. 6 and 7, it is possible to periodically update the transaction at the host institution by means of the payment voucher processing apparatus 10. Here, the merchant enters, at 232, a password to activate the updating function. Microprocessor 12 generates a credit total, at 234, which is the aggregate sum of all updated actual purchase amounts received from cash register processor 32. Microprocessor 12 activates, at 236, the autodialer 18 which opens a line to the host institution, as shown at 238. The updated transactions are then sequentially communicated to the host institution by starting with the first transaction, at 240, and transmitting that transaction, at 242, to the host institution. A decision is then made at 244 as to whether or not all transmission is complete. If not, the transmission is then incremented at 246 and the process is then looped until all updated transactions are transmitted to the host institution. As each transaction is received by the host institution, the host institution edits the accounts, at 246, in order to release the difference between maximum purchase amount held against the respective customers account and the actual charged purchase amount for the transaction, as is shown in 248. The host institution then, in the normal course of its business, charges the purchase amount against the customer account, as is shown at 250. When all updated transactions are transmitted to the host institution, microprocessor 12 transmits the credit total, as is shown at 252, to the host institution and, as is shown at 254, the host institution then credits the merchant account by transferring funds to the merchant in an amount equivalent to the credit total, again in the normal course of business. Microprocessor 12 then purges memory 26 and returns payment voucher processing apparatus 10 to the start position, as is shown at 256.

It should be understood from the foregoing that microprocessor 12 as well as cash register processor 32, if employed, are of a type generally known in the art. Thus, the circuitry structure of these devices is not specifically described herein but is deemed to be within ordinary skill in the microprocessor industry. It is important to note, however, that the microprocessor 12 and the cash register processor 32 are structured and programmed to include the structural features described above to accomplish their described purposes.

From the foregoing, it should be appreciated that the present invention contemplates a method for processing charge card transactions for a family of charge cards administered by a host institution. This method is employed wherein the host institution maintains a cardholder file of available credit limit for each member card account in the family of charge cards and wherein a merchant can obtain approval for a proposed credit charge against a charge card of a customer which card is a member of the family of charge cards so administered.

Broadly, the method of the present invention includes a first step of providing at least one payment voucher producing apparatus at a first location at a facility of the merchant, with the payment voucher producing apparatus including a data processor with memory. The next step is providing at least one point of purchase sales station, such as a cash register, at a second location at the facility of the merchant remote from the first location. Next, the method includes entering identification data into the payment voucher producing apparatus corresponding to a respective customer charge card, and entering a maximum charge amount into the payment voucher producing apparatus corresponding to a proposed charge transaction. Next, the method includes electronically transmitting the identification data and the maximum charge amount correlated thereto over a communication line to the host institution.

Continuing with this method, the next step occurs at the host institution and comprises verifying the available credit limit in the member card account corresponding to the respective customer charge card to determine if the credit limit of the member card account will be exceeded by the proposed charge transaction. Next, the host institution issues one of an approval signal if the maximum charge amount does not cause the credit limit to be exceeded and a disapproval signal if the maximum charge amount will cause the credit limit to be exceeded. The host institution reserves the maximum charge amount in the member card account concurrently with the issuance of an approval signal.

Once an approval signal is produced, the method includes the step of automatically producing a voucher at the payment voucher producing apparatus in response to receipt of the approval signal from the host institution with this voucher being automatically indexed with the identification data and a maximum charge amount. Preferably, it is also indexed with data signifying the approval. Next, the method includes storing the proposed charge transaction in the memory of the data processor and then completing a purchase transaction for selected goods or services at the point of purchase station for an actual purchase amount that is either less than or equal to the maximum charge amount. The method then includes the updating of the voucher at the point of purchase station to reflect the actual purchase amount, and editing the proposed charge transaction utilizing the data processor at the payment voucher apparatus to edit the maximum charge amount to an updated charge amount equal to the actual charge amount. The method then includes the step of electronically transmitting the updated charge amount and the identification data of the respective customer charge card to the host institution such that the host institution retrieves and updates the respective member card account at the host institution to edit the maximum charge amount to the updated charge amount and release the difference therebetween back into the member charge account so that it is again available in the credit limit of the member card account.

This broad method may be further refined wherein the step of automatically producing the voucher includes the production of a hard copy voucher capable of endorsement by the customer or by producing some other voucher that is capable of endorsement, such as by electronic signing on a touch screen. Further, the method may include the step of totaling the actual charge amounts of a plurality of transactions to provide a total charge and transmitting this total charge along with respective charge amounts to the host institution and electronically transferring funds from the host institution to an electronic funds account of the merchant in an amount equal to the total charge. Naturally, in this method, once data is transmitted to the host institution, it may be purged from the memory of the data processor.

Accordingly, the present invention has been described with some degree of particularity directed to the preferred embodiment of the present invention. If should be appreciated, though, that the present invention is defined by the following claims construed in light of the prior art so that modifications or changes may be made to the preferred embodiment of the present invention without departing from the inventive concepts contained herein.

I claim:

1. A payment voucher processing apparatus adapted to be used in conjunction with a family of charge cards wherein a customer who has a member charge card can execute a proposed transaction to obtain a guaranteed voucher for a selected maximum charge amount for purchase of goods or services from a merchant wherein a host institution administers customer accounts for the family of charge cards and has verification means for inquiring into the customer account to determine an availability of funds for a proposed charge and issues an approval status signal when funds are available and a disapproval status signal when funds are not available in the customer account, the payment voucher processing apparatus comprising:

a processing means for processing a proposed transaction;

a start means for producing a start signal to initiate a transaction event;

entry means for inputting into said processing means the proposed transaction including account identification data of a member charge card correlated to a customer account administered by the host institution and a maximum charge amount;

means for establishing communication with the host institution;

means for transmitting the identification data and the maximum charge amount to the host institution to interrogate the host institution regarding the availability of funds in customer account at least equal to the maximum charge amount;

receiving means for receiving approval and disapproval signals from the host institution;

said processing means including means responsive to an approval signal for producing a print signal;

voucher producing means responsive to the print signal to produce a voucher indexed with a maximum transaction charge equal to the maximum charge amount, and with the account identification data;

means for storing the account identification data and the maximum charge amount for each approved transaction;

means for retrieving each approved transaction; and edit means for editing each approved transaction to charge the maximum charge amount to an actual purchase amount whereby the actual purchase amount and the account identification data may be communicated to the host institution by way of the transmitting means.

2. A payment voucher processing apparatus according to claim 1 wherein said processing means includes means for producing a credit total by calculating the aggregate sum of the actual purchase amounts for a plurality of transaction events.

3. A payment voucher processing apparatus according to claim 1 wherein said entry means includes a charge card reader means for automatically scanning a charge card to obtain the account identification data contained thereon.

4. A payment voucher processing apparatus according to claim 1 wherein said entry means includes a manually operable keyboard input.

5. A payment voucher processing apparatus according to claim 1 including means for generating instruction signals and means for displaying said instruction signals.

6. A payment voucher processing apparatus according to claim 1 wherein said voucher producing means comprises a printer operative to produce duplicate copy vouchers for the maximum charge amount.

7. A payment voucher processing apparatus according to claim 1 wherein said processing means includes command key means for causing the establishing means to open a communication line to the host institution and for causing the transmitting means to transmit the identification data and the maximum charge amount to the host institution.

8. A payment voucher processing apparatus according to claim 1 wherein said processing means includes clock means for measuring first time duration between the start signal and the entry of identification data and the entry of a maximum charge amount, said clock means for terminating the proposed transaction when either of the first and second time durations exceed preselected respective time limits.

9. A payment voucher processing apparatus according to claim 1 wherein said processing means is operative in response to a disapproval signal to terminate a transaction event.

10. A payment voucher processing apparatus according to claim 1 including accumulating means for storing the actual charge amount and the respective account identification data for a plurality of transactions and for producing a total charge equal to the sum of all actual charge amounts stored.

11. A payment voucher processing apparatus according to claim 1 including means for sequentially transmitting the actual charge amounts and the respective account identification data and the total charge to the host institution.

12. A payment voucher processing apparatus according to claim 1 including means for producing a summary record of all approved transactions occurring during a selected billing cycle wherein the record shows the account identification and the actual charge amount for each transaction occurring during the billing cycle.

13. A payment voucher apparatus for use in conjunction with a family of charge cards wherein customers who have a respective member of said family of charge cards can each execute a transaction to obtain a guaranteed voucher for a selected maximum charge amount for use in purchasing goods or services from a merchant wherein a host institution administers accounts for the family of charge cards and issues approval/disapproval status signals for a proposed charge and a guarantee of payment of the proposed charge along with approval identifier data when the merchant receives an approval thereof, the payment voucher apparatus comprising:

data transmitting and receiving means for transmitting and receiving data respectively to and from the host institution over a communication line established therebetween;

a microprocessor in communication with said data transmitting and receiving means;

manual entry means for inputting into said microprocessor transaction data corresponding to the proposed charge including the maximum charge amount, said manual entry means including a start key means for initiating the transactions;

an autodialer means responsive to activation of the start key means for automatically opening the communication line with the host institution;

a charge card reader operative to receive a customer's charge card and produce identification data corresponding to the charge card, said identification data transmitted to the host institution by said data transmitting and receiving means over the communication line opened by the autodialer means;

said microprocessor operative in response to input of transaction data from said manual entry means to interrogate the host institution by way of said data transmitting and receiving means in order to obtain the approval/disapproval status for the proposed charge, said microprocessor operative in response to an approval signal and approval identifier data to produce a print signal, said microprocessor including data storage means for storing the identification data and the transaction data for each approved transaction;

a printer operative in response to the print signal to produce a voucher being exchangeable for goods or services of the merchant; said voucher being for an approved charge corresponding to the maximum charge amount, said voucher indexed with transaction identification data, the maximum charge amount and the approval identifier data; and said microprocessor operative in response to input of the actual purchase amount for the respective transaction by the manual entry means to retrieve the respective transaction data stored in said data storage means and edit the respective maximum charge amount to reflect the actual purchase amount for the respective transaction and store said actual purchase amount, whereby each voucher is corrected at a point of purchase to create an updated receipt reflecting an actual purchase amount.

14. A payment voucher apparatus according to claim 13 wherein said microprocessor is operative in response to a disapproval signal received form the host institution by way of said data transmitting and receiving means to terminate the transaction.

15. A payment voucher apparatus according to claim 13 wherein said printer is operative in response to the print signal to produce duplicate vouchers for the proposed charge.

16. A payment voucher apparatus according to claim 13 including means for accumulating a plurality of actual purchase amounts for a plurality of transactions and for producing a credit total amount equal to the sum thereof.

17. A payment voucher apparatus according to claim 13 including cash register means located remotely of said microprocessor, said cash register means having register keyboard means for entering the actual purchase amount of a transaction, said cash register means for generating an actual charge data signal, representative of the actual purchase amount, said cash register means being in communication with said microprocessor, said microprocessor having means for automatically editing the respective maximum charge amount in response to the actual charge data signal to edit the maximum charge amount to an actual charge amount equal to the actual purchase amount and thereafter store the actual charge amount.

18. A payment voucher apparatus according to claim 17 including means for accumulating said actual charge amounts and for producing a credit total amount equal to the sum thereof.

19. A payment voucher apparatus according to claim 17 including voucher reading means in communication with said cash register means for reading the transaction identification data and the maximum charge amount on a respective voucher and for generating a cash register input signal representative thereof, said cash register means receiving the cash register input signal and responsive thereto to enter the transaction identification data and the maximum charge amount for the respective transaction into said cash register means.

20. A payment voucher apparatus according to claim 19 wherein said cash register means includes comparator means for comparing the actual purchase amount with the maximum charge amount and limit means for preventing completion of the transaction when the actual credit charge exceeds the approved charge.

21. A payment voucher apparatus according to claim 13 including display means for displaying operating procedure instructions, the maximum charge amount and the approval/disapproval status of the proposed transaction.

22. A payment voucher apparatus according to claim 13 including a "reset" key, said microprocessor operative in response to activation of the "reset" key to cancel the transaction data received from said keyboard means and to allow input of new transaction data thereby.

23. In combination with a system for issuing approval status and disapproval status wherein a host institution supervises a family of charge cards and maintains a file of available credit limit for each member card of said family of charge cards and wherein a merchant subscribing to said system can obtain an approval status or disapproval status for a proposed credit charge against a customer charge card that is a member of said family of charge cards, a payment voucher processing apparatus maintained at a first location by the merchant, a charge card reader means for scanning the customer charge card and reading identification data therefrom, entry means for entering a proposed maximum charge amount into said payment voucher apparatus, an autodialer means responsive upon activation to open a communication line to the host institution. Means for transmitting the identification data and the maximum charge amount to the host institution, verification means maintained by the host institution responsive to receipt of the identification data and the maximum charge amount for interrogating the respective file of available credit limit for the respective member card to determine whether the maximum charge amount exceeds the available credit limit, approval/disapproval means at the host institution for issuing an approval status signal when the maximum charge amount does not exceed the available credit limit and a disapproval status signal when the maximum charge amount does exceed available credit limit, receiving means at the merchant member for receiving approval and disapproval status signals issued by the host institution, means responsive to receipt of an approval signal for producing a voucher against the customer charge card for the maximum charge amount said voucher being exchangeable for goods and services of the merchant, storage means at said merchant member for storing a customer transaction including identification data of the customer charge card and the maximum charge amount approved by the host institution corresponding to the customer card, and means for editing the maximum charge amount to reflect an actual purchase amount that is less than or equal to the maximum charge amount.

24. A combination as in claim 23 including reset means for canceling the proposed maximum charge amount before said transmitting means transmits the proposed maximum charge amount to the host institution whereby a new proposed maximum charge amount may be entered by said manual entry means.

25. A combination as in claim 23 including means at said host institution for deducting an approved maximum charge amount from the available credit limit corresponding to the file thereof corresponding to the respective member card.

26. A combination as in claim 25 wherein said storage means stores a plurality of customer transactions occurring during a selected billing cycle.

27. A combination as in claim 26 including means for transmitting the actual purchase amount correlated to identification data of the respective charge card of the plurality of customer transactions to the host institution.

28. A combination as in claim 27 where the host institution has means for updating the file of available credit limit for the respective customer card to recredit each file with any difference between the maximum charge amount deducted from the respective file and the actual charge amount against the respective file.

29. A combination as in claim 28 including accumulating means for totaling all actual charges into a total credit amount and means maintained by the host institution for crediting the merchant member with funds corresponding to the total credit amount.

30. A combination as in claim 26 wherein said editing means is defined by said manual entry means.

31. A combination as in claim 26 wherein said editing means includes cash register means having register keyboard means for entering an actual purchase amount correlated to a respective customer transaction and means for accessing said storage means to automatically edit the respective maximum charge amount approved by the host institution to reflect the actual purchase amount corresponding to the respective customer transaction.

32. A combination as in claim 31 wherein said producing means indexes identification data on the vouchers in a machine readable format, and including means associated with said cash register means for reading the vouchers to input the identification data into said cash register means.

33. A combination as in claim 32 wherein said producing means indexes the maximum charge amount on the vouchers in a machine readable format, and including means associated with said cash register means for reading the vouchers to input the maximum charge amount into said cash register means.

34. A combination as in claim 31 where said cash register means includes register means for updating the voucher with the actual purchase amount.

35. A payment voucher apparatus according to claim 23 including display means for displaying operating procedure instructions, the maximum charge amount and the approval/disapproval status of the proposed transaction.

36. A method for processing charge card transactions for a family of charge cards administered by a host institution wherein the host institution maintains a cardholder file of available credit limit for each member card account in the family of charge cards and wherein a merchant can obtain an approval for a proposed credit charge against a charge card of a customer which charge card is a member of the family of charge cards comprising the steps of:
providing at least one payment voucher producing apparatus at a first location at a facility of the merchant including a data processor with memory;
providing at least one point of purchase sales station at a second location at the facility of the merchant remote from said first location;
entering identification data into said payment voucher producing apparatus corresponding to a respective customer charge card;
entering a maximum charge amount into said payment voucher producing apparatus corresponding to a proposed charge transaction;
electronically transmitting to the host institution over a communication line the identification data and the maximum charge amount correlated thereto;
verifying at the host institution the available credit limit in the member card account corresponding to the respective customer charge card to determine if the credit limit of the member card account to be exceeded;
issuing one of an approval signal if the maximum charge amount does not cause the credit limit to be exceeded while reserving the maximum charge amount in the member card account concurrently with the issuance of the approval signal and a disapproval signal if the maximum charge amount will cause the credit limit of the member card account to be exceeded;
automatically producing a voucher at the payment voucher producing apparatus in response to receipt of an approval signal from the host institution, said voucher being automatically indexed with the identification data and maximum charge amount;
storing the proposed charge transaction in memory of the data processor;
completing a purchase transaction for selected goods or services at the point of purchase station for an actual purchase amount less than or equal to the maximum charge amount;
updating the voucher at the point of purchase station to reflect the actual purchase amount;
editing the proposed charge transaction utilizing the data processor at the payment voucher apparatus to edit the maximum charge amount to an updated charge amount equal the actual charge amount;
electronically transmitting the updated charge amount and the identification data of the respective customer charge card to the host institution; and
retrieving and updating the respective member card account at the host institution to edit the maximum charge amount to the updated charge amount and release the difference therebetween back into the member charge account so that it is again available in the credit limit of the member card account.

37. A method according to claim 36 wherein the step of automatically producing a voucher includes producing a hard copy voucher capable of endorsement by the customer.

38. A method according to claim 36 including the step of totaling the actual charge amounts of a plurality of transactions to produce a total charge, transmitting the total charge along with the respective updated charge amounts to the host institution and electronically transferring funds from the host institution to an electronic funds account of the merchant in an amount equal to the total charge.

39. A method according to claim 38 including the step of purging the memory of the data processor of all edited charge transactions transmitted to the host institution.

* * * * *